(12) United States Patent
Amm et al.

(10) Patent No.: US 6,896,822 B2
(45) Date of Patent: May 24, 2005

(54) BLAZED GRATING LIGHT VALVE

(75) Inventors: David T. Amm, Kingston (CA); Jahja Trisnadi, Cupertino, CA (US); James Hunter, Campbell, CA (US); Christopher Gudeman, Los Gatos, CA (US); Dinesh Maheshwari, Fremont, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 308 days.

(21) Appl. No.: 10/321,342

(22) Filed: Dec. 16, 2002

(65) Prior Publication Data

US 2003/0223116 A1 Dec. 4, 2003

Related U.S. Application Data

(62) Division of application No. 09/930,838, filed on Aug. 15, 2001, now Pat. No. 6,829,092.

(51) Int. Cl.[7] .......................... B29D 11/00; H01L 21/00
(52) U.S. Cl. ........................................ 216/24; 438/29
(58) Field of Search ............................. 216/2, 23, 24; 359/290, 291, 292, 295, 237, 238, 224; 438/29, 30

(56) References Cited

U.S. PATENT DOCUMENTS 5,661,592 A * 8/1997 Bornstein et al. ........... 359/291
6,238,581 B1 * 5/2001 Hawkins et al. ............. 216/13
6,407,851 B1 * 6/2002 Islam et al. ................. 359/291

* cited by examiner

*Primary Examiner*—Gregory Mills
*Assistant Examiner*—Roberts Culbert
(74) *Attorney, Agent, or Firm*—Okamoto & Benedicto LLP

(57) ABSTRACT

A light modulator includes elongated elements arranged parallel to each other. In a first diffraction mode, the light modulator operates to diffract an incident light into at least two diffraction orders. In a second diffraction mode, the light modulator operates to diffract the incident light into a single diffraction order. Each of the elongated elements comprises a blaze profile, which preferably comprises a reflective stepped profile across a width of each of the elongated elements and which produces an effective blaze at a blaze angle. Alternatively, the blaze profile comprises a reflective surface angled at the blaze angle. Each of selected ones of the elongated elements comprise a first conductive element. The elongated elements produce the first diffraction when a first electrical bias is applied between the first conductive elements and a substrate. A relative height of the blazed portions are adjusted to produce the second diffraction when a second electrical bias is applied between the first conductive elements and the substrate. In an alternative embodiment, each of the elongated elements includes the first conductive element and multiple elongated elements are arranged in groupings, where each of the groupings includes at least three of the elongated elements. When the multiple elongated elements are at a first height, the incident light reflects from the elongated elements. When relative heights of the multiple elongated elements are adjusted by applying individual electrical biases between the first conductive elements and the substrate, the incident light diffracts into the single diffraction order.

19 Claims, 12 Drawing Sheets

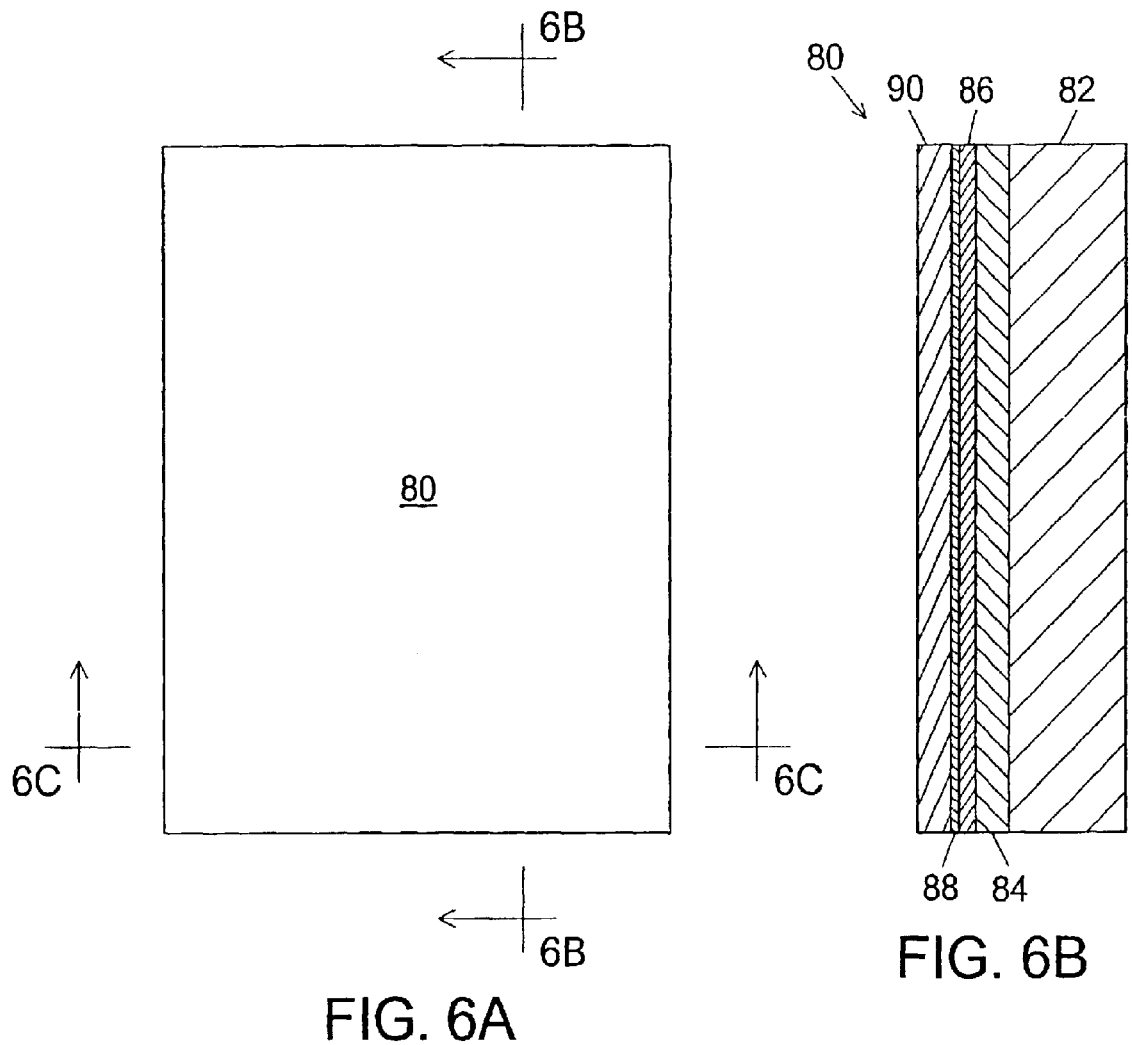
FIG. 6A
FIG. 6B
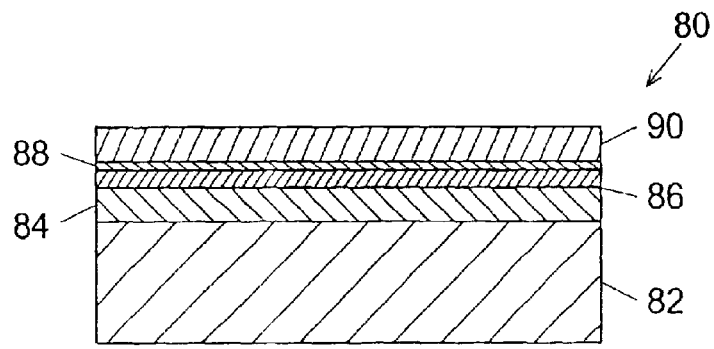
FIG. 6C

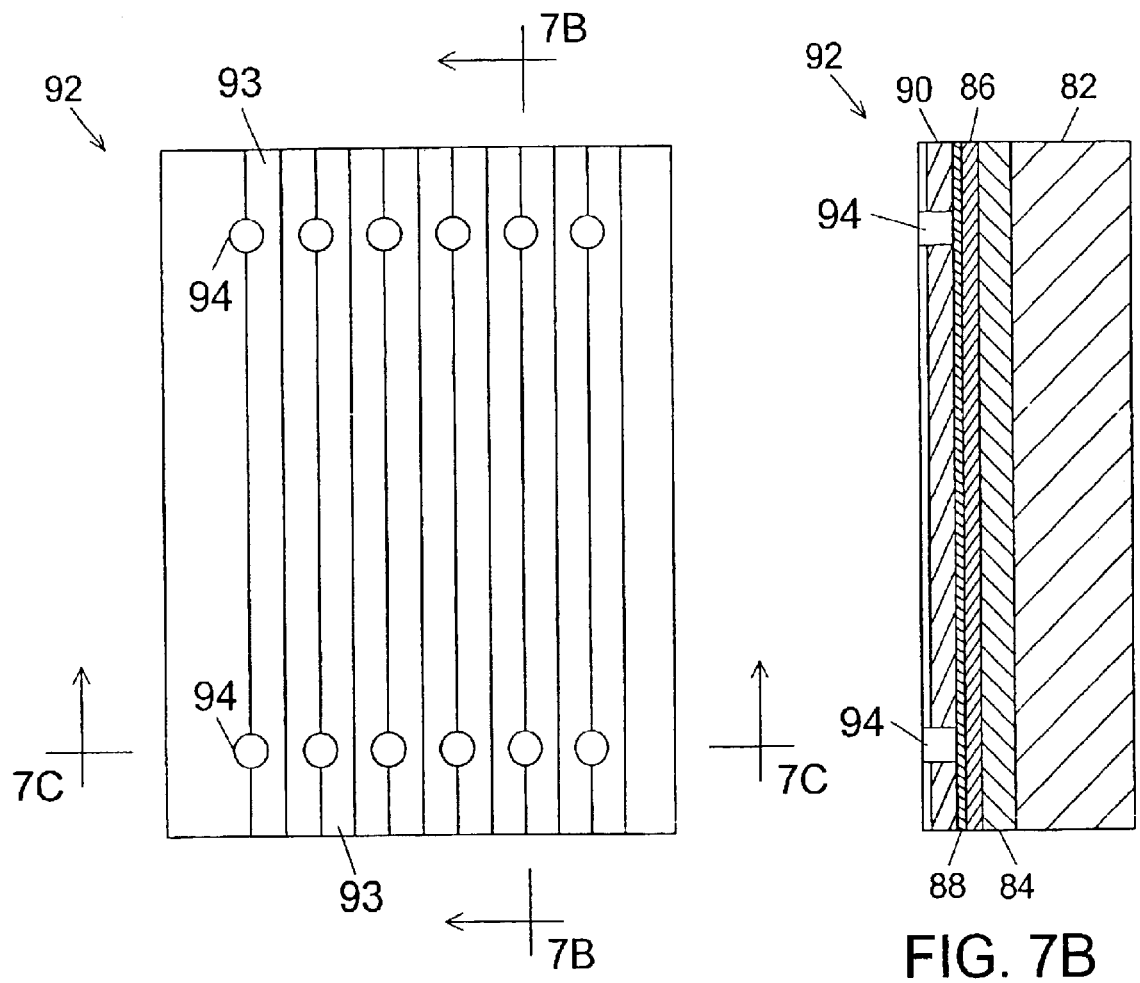
FIG. 7A
FIG. 7B
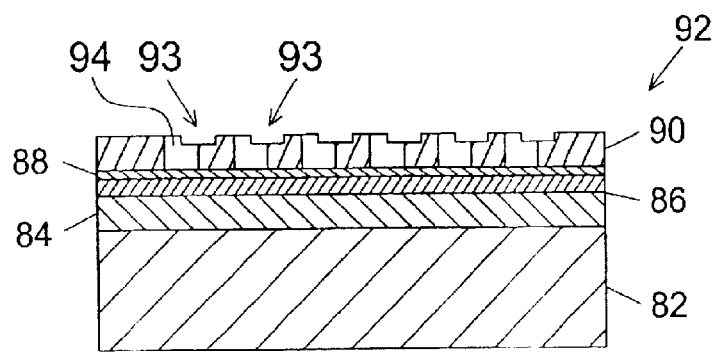
FIG. 7C

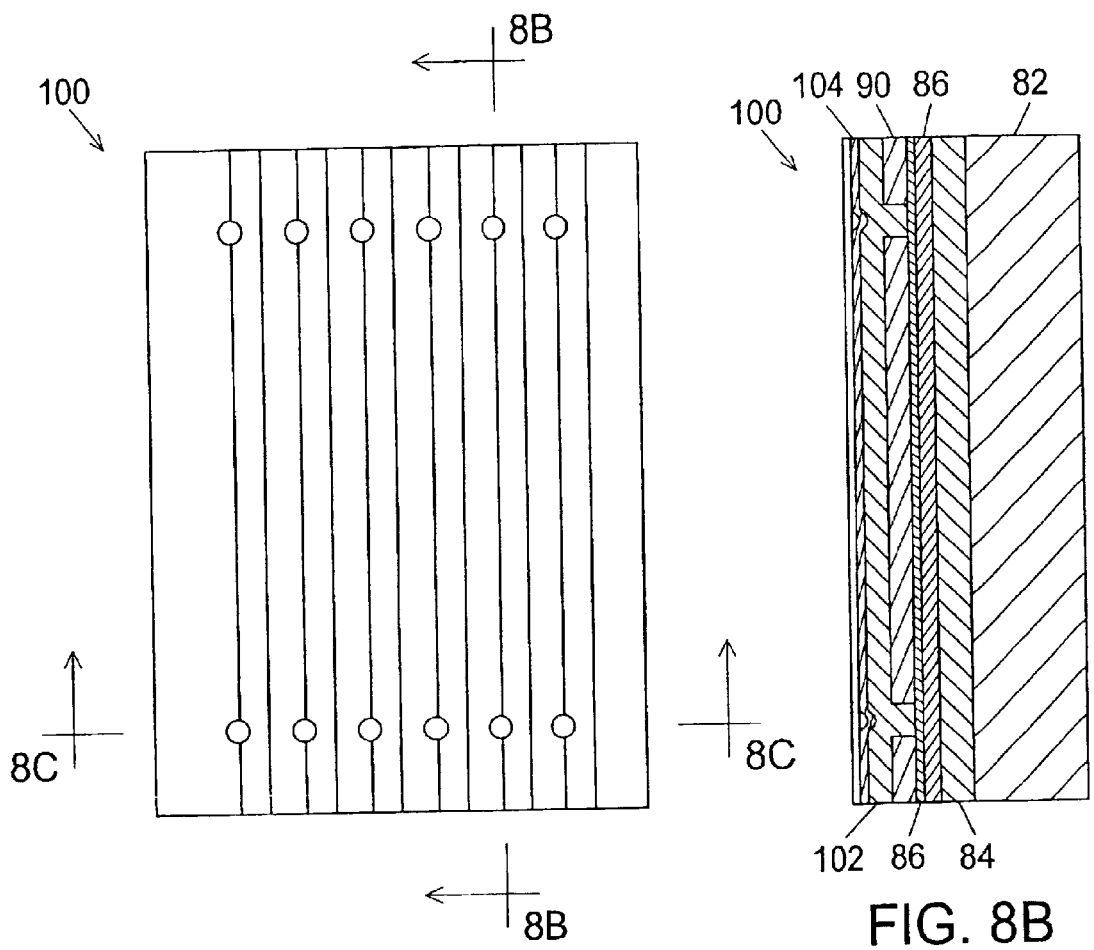
FIG. 8A
FIG. 8B
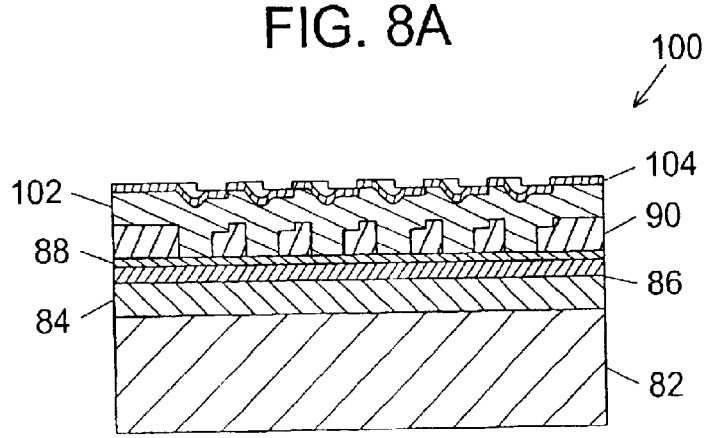
FIG. 8C

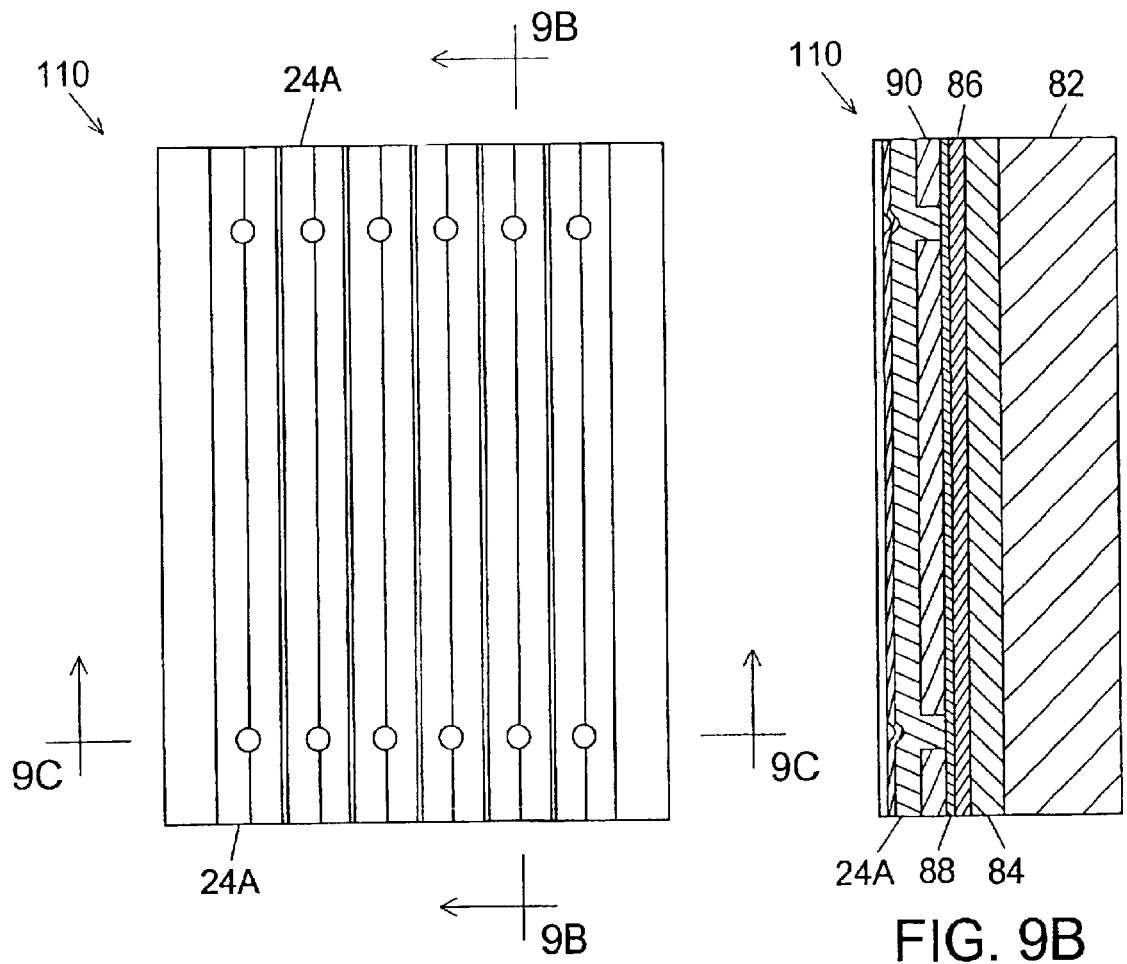
FIG. 9A
FIG. 9B
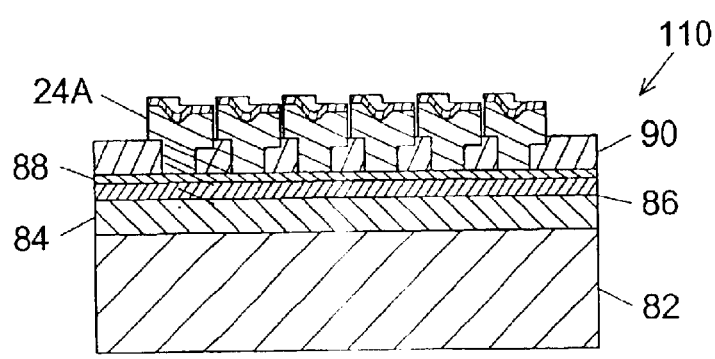
FIG. 9C

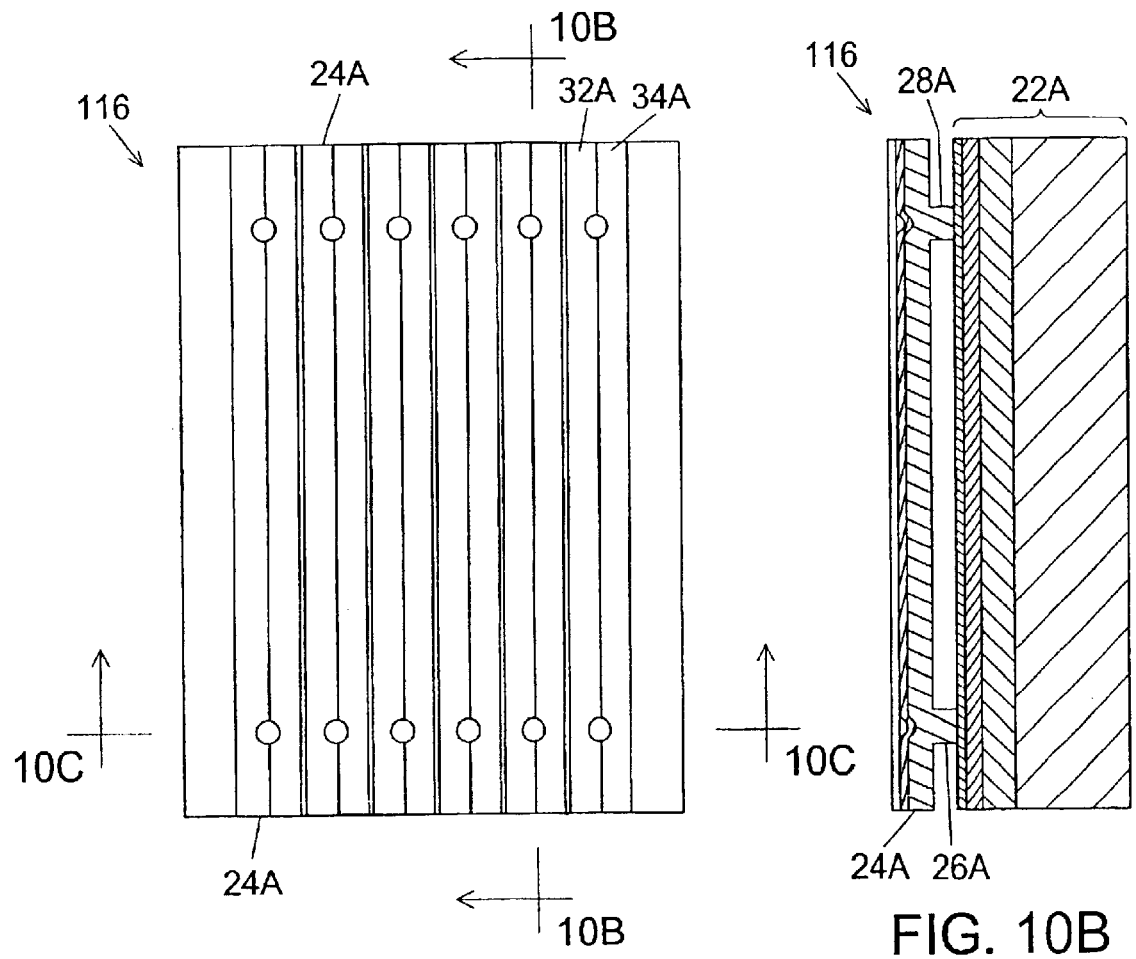
FIG. 10A
FIG. 10B
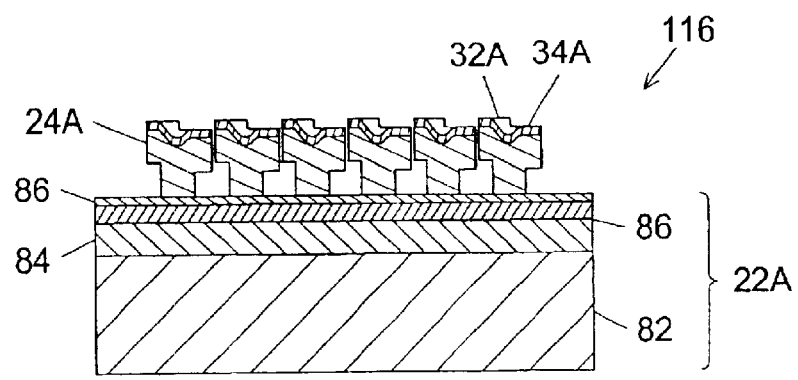
FIG. 10C

US 6,896,822 B2

BLAZED GRATING LIGHT VALVE

RELATED APPLICATION(S)

This is a divisional application of U.S. patent application Ser. No. 09/930,838, filed Aug. 15, 2001 now U.S. Pat. No. 6,829,092, entitled "BLAZED GRATING LIGHT VALVE", the contents of which are hereby incorporated by reference.

FIELD OF THE INVENTION

This invention relates to the field of light modulators. More particularly, this invention relates to the field of light modulators where an incident light is modulated to produce a blazed diffraction.

BACKGROUND OF THE INVENTION

Bloom et al. in U.S. Pat. No. 5,311,360, entitled "Method and apparatus for modulating a light beam," teach a grating light valve which operates in a reflection mode and a diffraction mode. The grating light valve includes elongated elements suspended above a substrate. In the reflective mode, reflective surfaces of the grating light valve cause incident light to constructively combine to form reflected light. In the diffractive mode, the reflective surfaces of the grating light valve are separated by a quarter wavelength of the incident light to produce diffracted light. When the grating light valve is in the diffractive mode, the grating light valve predominantly diffracts light into a plus one diffraction order and a minus one diffraction order but also diffracts a small amount of light into higher diffraction orders.

Bloom et al. further teach an alternative grating light valve which operates in the reflection mode and in a blazed diffraction mode. The alternative grating light valve includes the elongated elements suspended above the substrate. For the alternative grating light valve, the elongated elements include off-axis neck portions at ends of each of the elongated elements. In the reflection mode, the elongated elements are parallel causing incident light to reflect from the elongated elements and, thus, produce the reflected light. In the blazed diffraction mode, each of the elongated elements is rotated about an axis defined by the off-axis neck portions to produce a blazed diffraction.

Because the light modulator is switched between the reflection mode and the blazed diffraction mode and because the reflection mode diffracts small quantities of light into the same angles as does the blazed diffraction mode, a contrast between the non-activated state and the activated state is less than an optimum contrast. Further, the off-axis neck portions are critical to operation of the light modulator which necessitate tight tolerances for the off-axis neck portions making the light modulator relatively difficult to fabricate and also relatively expensive to fabricate.

What is needed is a blazed diffractive light modulator which provides higher contrast.

What is needed is a blazed diffractive light modulator which is easier to fabricate.

What is needed is a blazed diffractive light modulator which is more economical to fabricate.

SUMMARY OF THE INVENTION

The present invention is a light modulator. The light modulator includes elongated elements arranged parallel to each other and suspended above a substrate. The light modulator operates in a first diffraction mode and in a second diffraction mode. In the first diffraction mode, an incident light diffracts into at least two diffraction orders. In the second diffraction mode, the incident light diffracts into a single diffraction order, which is at a diffraction angle different from diffraction angles for the at least two diffraction orders.

Each of the elongated elements comprises a blaze profile. Preferably, the blaze profile comprises a stepped profile across a width of each of the elongated elements where the blaze profile produces an effective blaze at a blaze angle. Alternatively, the blaze profile comprises a surface angled at the blaze angle.

Each blaze profile comprises a reflective surface. Each of selected ones of the elongated elements comprise a first conductive element along the elongated element. The elongated elements are coupled to the substrate. The substrate comprises a second conductive element.

The elongated elements produce the first diffraction when a first electrical bias, preferably a zero electrical bias, is applied between the first conductive elements of the selected ones of the elongated elements and the second conductive element. A relative height of the blazed portions are adjusted to produce the second diffraction when a second electrical bias is applied between the first conductive elements of the selected ones of the elongated elements and the second conductive element.

In an alternative embodiment, multiple elongated elements are arranged in groupings. Each of the groupings includes at least three of the elongated elements and each grouping includes an identical number of the elongated elements. Each of the elongated elements in the alternative embodiment includes the first conductive element. When the multiple elongated elements of each of the groupings are at a first height, the incident light reflects from the elongated elements. When relative heights of the multiple elongated elements of each of the groupings are adjusted by applying individual electrical biases between the first conductive elements and the second conductive element, the incident light diffracts into a single diffraction order.

BRIEF DESCRIPTION OF THE DRAWINGS

FIGS. 6A, 6B, and 6C illustrate a plan view and two orthogonal cross-sectional views, respectively, of a first partially fabricated blazed grating light valve of the present invention.

FIGS. 7A, 7B, and 7C illustrate a plan view and two orthogonal cross-sectional views, respectively, of a second partially fabricated blazed grating light valve of the present invention.

FIGS. 8A, 8B, and 8C illustrate a plan view and two orthogonal cross-sectional views, respectively, of a third partially fabricated blazed grating light valve of the present invention.

FIGS. 9A, 9B, and 9C illustrate a plan view and two orthogonal cross-sectional views, respectively, of a fourth partially fabricated blazed grating light valve of the present invention.

FIGS. 10A, 10B, and 10C illustrate a plan view and two orthogonal cross-sectional views, respectively, of a fabricated blazed grating light valve of the present invention.

DETAILED DESCRIPTION OF THE PREFERRED EMBODIMENT

Figure 1:
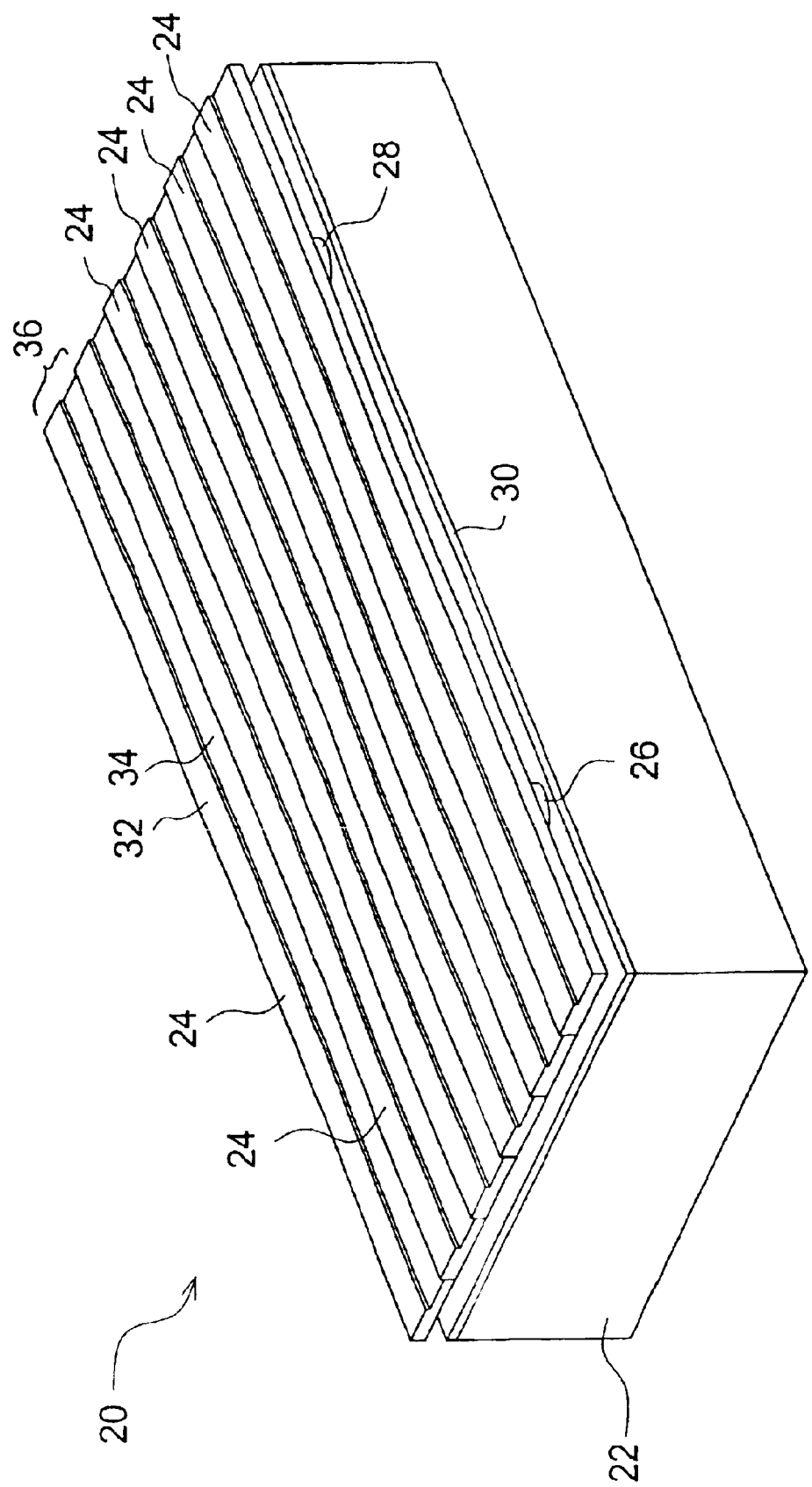
FIG. 1 illustrates an isometric view of the preferred blazed grating light valve (GLV) of the present invention.

The preferred blazed grating light valve is illustrated isometrically in FIG. 1. The preferred blazed grating light valve 20 includes a substrate 22, elongated elements 24, first posts 26 (one shown), and second posts 28 (one shown). The substrate 22 includes a first conductor 30. The elongated elements 24 each preferably include a first surface 32 and a second surface 34, both of which are reflective. The first and second surfaces, 32 and 34, form a blaze profile 36 for each of the elongated elements 24. One of the first posts 26 and one of the second posts 28 couple each of the elongated elements 24 to the substrate 22. Each of the elongated elements 24 are also preferably coupled to the substrate 22 at first and second ends (not shown) of the elongated element 24.

Figures 2A, 2B:
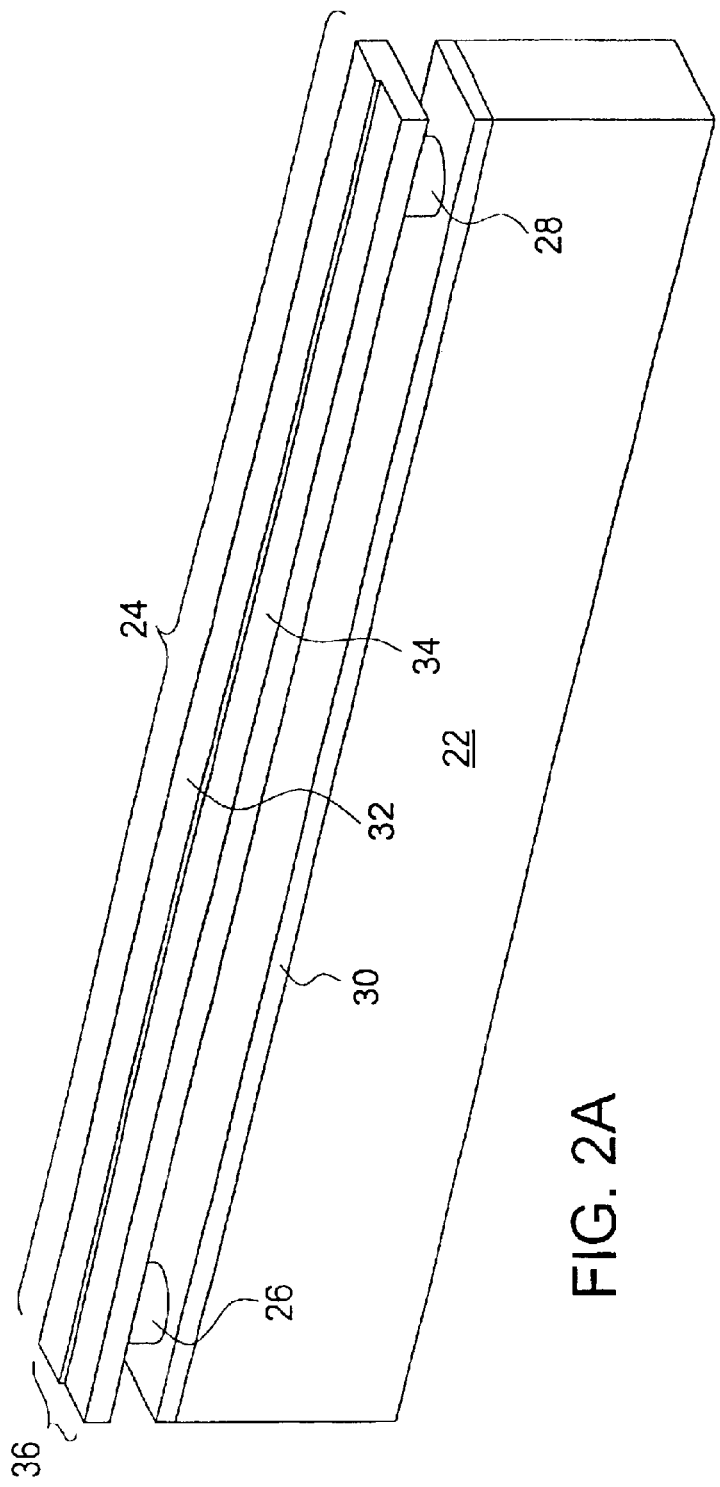
FIG. 2A illustrates an isometric view of a single elongated element and an underlying substrate of the preferred blazed grating light valve of the present invention.
FIG. 2B further illustrates the single elongated element and the underlying substrate of the present invention.

One of the elongated elements 24 and a portion of the substrate 22 are further illustrated isometrically in FIG. 2A. The elongated element 24 includes the first and second surfaces, 32 and 34, both of which are reflective. The first and second surfaces, 32 and 34, form the blaze profile 36. The elongated element 24 is coupled to the substrate by the first and second posts, 26 and 28, and also at the first and second ends (not shown). Preferably, the elongated element 24, the first post 26, and the second post 28 are comprised of a resilient material. Preferably, the resilient material comprises silicon nitride. Preferably, the first and second surfaces, 32 and 34, comprise a reflector. Preferably, the reflector comprises an aluminum layer. Alternatively, the reflector is a different metal. Further alternatively, the reflector is a multilayered dielectric reflector. The substrate 22 includes the first conductor 30. Preferably, the substrate 22 comprises silicon and the first conductive layer comprises doped poly-silicon. For a visible spectrum application, the elongated element 24 preferably has a length from the first post 26 to the second post of about 200 $\mu$m and a width of about 4.25 $\mu$m.

The elongated element 24 and the substrate 22 are further illustrated in FIG. 2B. The elongated element 24 preferably comprises a central portion 42 and first and second outer portions, 44 and 46. The first outer portion 44 is preferably coupled to the substrate 22 at the first end 38 and the first post 26. The second outer portion is preferably coupled to the substrate 22 at the second end 40 and the second post 28. Preferably, the first and second outer portions, 44 and 46, are also coupled to the substrate 22 by first and second anchors, 29 and 31, located proximate to the first and second ends, 38 and 40, respectively. Preferably, the first and second anchors, 29 and 31, have an oval cross-section with a long axis of the oval cross-section oriented parallel to a length of the elongated elements 24. By orienting the long axes of the first and second anchors parallel the length of the elongated elements 24, the first and second anchors, 29 and 31, are relatively stiff in a tension direction defined by) the internal tensile stress within the elongated elements 24. Preferably, lengths of the first and second outer portion, 44 and 46, are about as long as the central portion 42. Alternatively, the lengths of the first and second outer portion, 44 and 46, are longer or shorter than the central portion 42. The first and second outer portions, 44 and 46, assure uniform fabrication of the first and second posts, 26 and 28, and the elongated elements 24 in the vicinity of the first and second posts, 26 and 28, and in between the first and second posts, 26 and 28.

Figure 3:
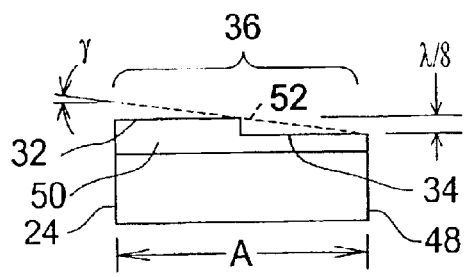
FIG. 3 illustrates a cross section of an elongated element of the present invention.

A cross-sectional view of the elongated element 24 of the present invention is illustrated in FIG. 3. The elongated element 24 preferably comprises a rectangular body 48 and a stepped reflector 50. The rectangular body preferably comprises silicon nitride and the stepped reflector 50 preferably comprises aluminum. The stepped reflector 50 forms the first and second surfaces, 32 and 34, of the elongated element 24. The first and second surfaces, 32 and 34, are preferably separated by a height difference of an eighth wavelength $\lambda/8$ of an incident light. The first and second surfaces, 32 and 34, form the blaze profile 36. The blaze profile 36 forms an effective blaze surface 52 at a blaze angle $\gamma$. The blaze angle $\gamma$ is given by the expression: $\gamma=\arctan(\lambda/(4A))$.

Figure 4A:
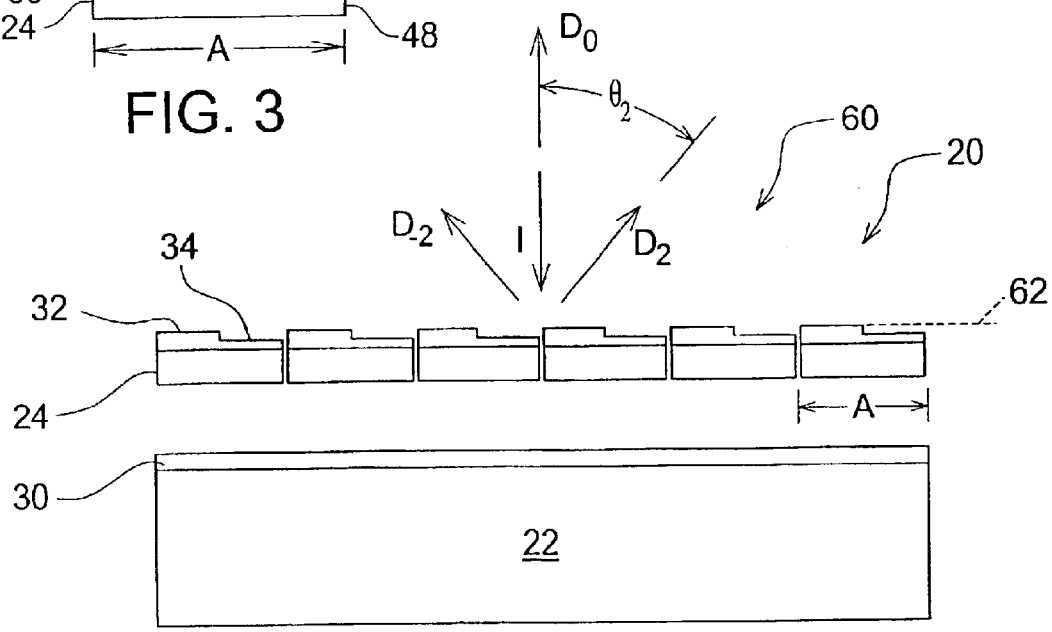
FIGS. 4A and 4B illustrate a cross-sectional view of the preferred blazed grating light valve of the present invention in a non-activated state and in a fully activated state, respectively, where an incident light is normal to a grating plane.

A first cross-sectional view of the preferred blazed grating light valve 20 of the present invention is illustrated in FIG. 4A. The first cross-sectional view 60 illustrates the preferred grating light valve 20 in a non-activated state with the elongated elements 24 on a grating pitch A and with the first surfaces 32 defining a grating plane 62. In the non-activated state, there is preferably a zero electrical bias between the elongated elements 24 and the first conductor 30. The incident light I of wavelength $\lambda$ illuminates the preferred blazed grating light valve 20 normal to the grating plane 62. The preferred blazed grating light valve 20 diffracts light into diffraction orders. For discussion purposes, the diffraction orders are based on a second grating pitch 2A, which is twice the grating pitch A.

In the non-activated state, the incident light I of the wavelength $\lambda$ is diffracted into a zeroth diffraction order $D_0$, a second diffraction order diffraction $D_2$, and a minus second order diffraction $D_{-2}$. The zeroth order diffraction $D_0$ is normal to the grating plane 62. The second order diffraction $D_2$ and the minus second order diffraction $D_{-2}$ are at a second order diffraction angle $\theta_2$ given by the expression: $\theta_2=\arcsin(\lambda/A)$. For the preferred blazed grating light valve 20, the second order diffraction angle $\theta_2$ is less than about 15°. Thus, for the preferred blazed grating light valve 20, the second order diffraction angle $\theta_2$ is approximately four times the blaze angle $\gamma$.

Neglecting a first light loss due to absorption by the stepped reflectors 50 and a second light loss by the incident light I passing through gaps between adjacent pairs of the elongated elements 24, half of the incident light I is diffracted into the zeroth diffraction order $D_0$ while a quarter of the incident light I is diffracted into each of the second diffraction order $D_2$ and the minus second diffraction order $D_{-2}$.

Figure 4B:
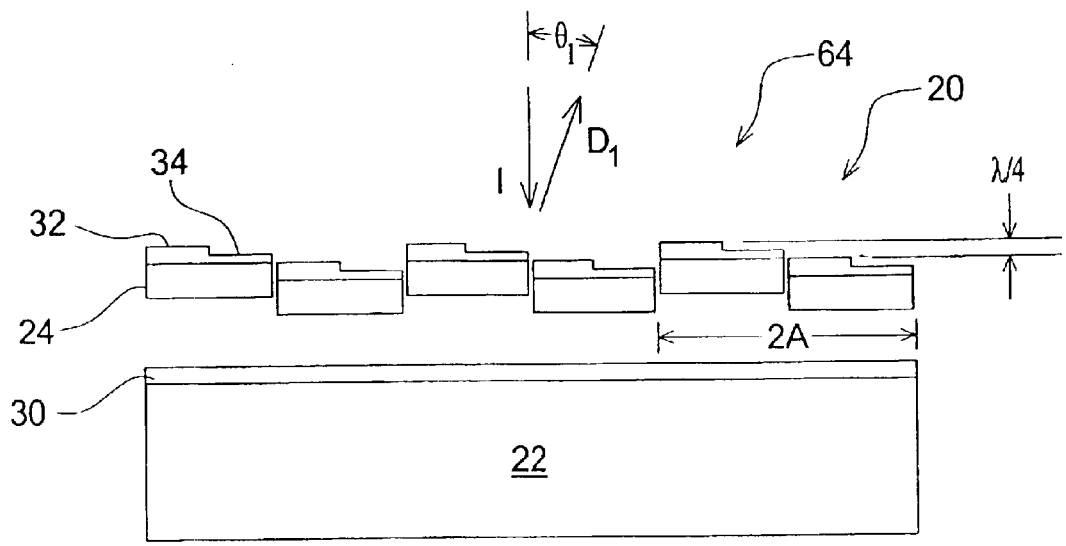

A second cross-sectional view of the preferred blazed grating light valve 20 of the present invention is illustrated in FIG. 4B. The second cross-sectional view 64 illustrates the preferred grating light valve 20 in an activated state. Preferably, to produce the activated state, alternate ones of the elongated elements 24 are moved toward the substrate 22 by applying an electrical bias between the first conductor 30 and the reflective surface 42 of the alternate ones of the elongated elements 24. In a fully activated state, the electrical bias moves the alternate ones of the elongated elements 24 by a quarter wavelength $\lambda/4$ of the incident light I. This results in pairs of the elongated elements 24 forming an effective fully activated height difference of a half wavelength $\lambda/2$ of the incident light I at the blaze angle $\gamma$.

In the fully activated state, the incident light I of the wavelength $\lambda$ is diffracted into a first diffraction order $D_1$ having a first order angle $\theta_1$. The first order angle $\theta 1$ is given by the expression: $\theta_1 = \arcsin(\lambda/2\Lambda)$. For the preferred grating light valve 20 as described here, the first order angle $\theta_1$ is approximately twice the blaze angle $\gamma$.

Figure 5A:
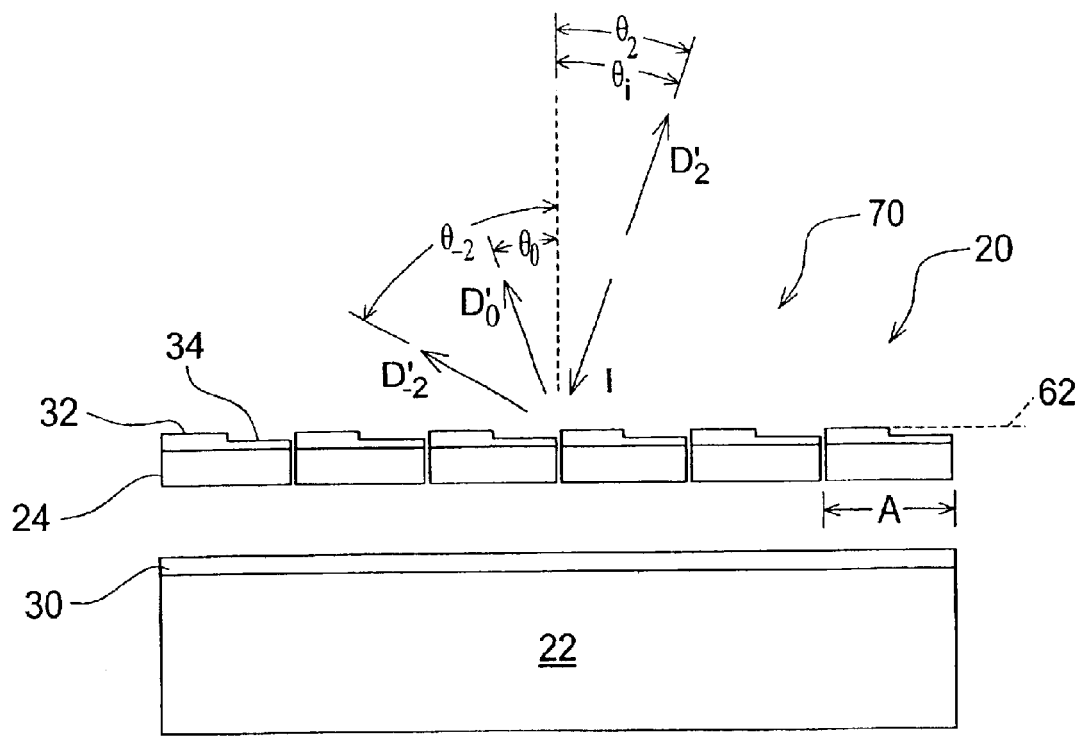
FIGS. 5A and 5B illustrate the cross-sectional view of the preferred blazed grating light valve of the present invention in the non-activated state and in the fully activated state, respectively, where the incident light is at an oblique angle such that, in the non-activated state, diffracted light is placed in a zero order diffraction and further such that, in the fully activated state, light is placed in a first order diffraction, which is normal to the grating plane.

A third cross-sectional view of the preferred blazed grating light valve 20 of the present invention is illustrated in FIG. 5A. The third cross-sectional view 70 illustrates the preferred blazed grating light valve 20 in the non-activated state with the incident light I at an oblique angle $\theta_i$ to the grating plane 62. In the non-activated state, the incident light I is diffracted into an oblique zeroth order diffraction $D'_0$, and an oblique second order diffraction $D'_2$, and an oblique minus second order diffraction $D'_{-2}$. The oblique zeroth order diffraction $D'_0$ is at an oblique zeroth order angle $\theta'_0$ with respect to the normal to the grating plane 62, which is equal to the oblique angle $\theta_i$. The oblique zeroth order angle $\theta'_0$ and oblique angle $\theta_i$ are given by the expression: $\theta'_0 = \theta_i = \arcsin(\lambda/2\Lambda)$. The oblique second order diffraction $D'_2$ is at the oblique angle $\theta_i$. The oblique minus second order diffraction $D'_{-2}$ is at an oblique minus second order angle $\theta'_{-2}$, which is twice the zeroth order angle $\theta'_0$.

Figure 5B:
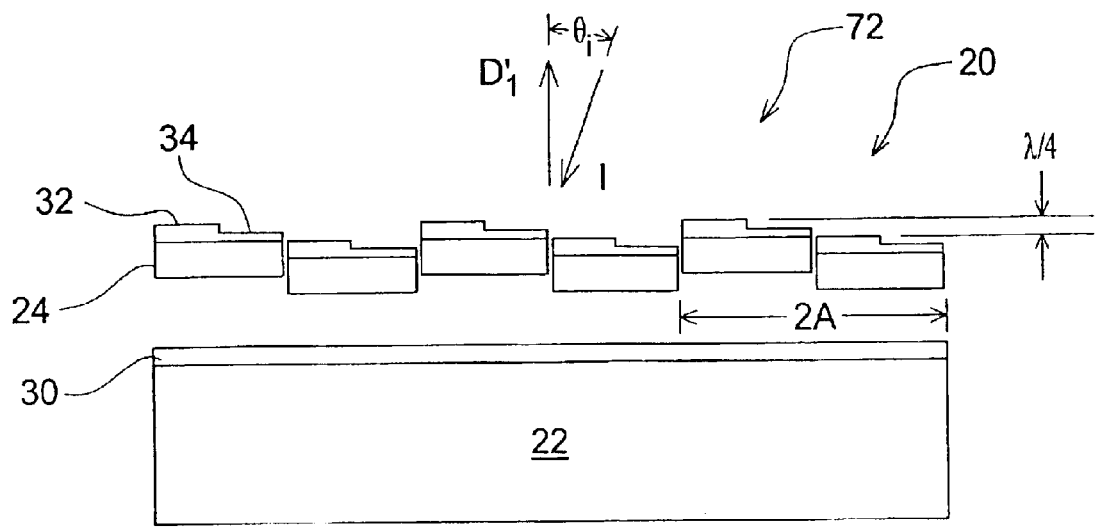

A fourth cross-sectional view of the preferred blazed grating light valve 20 of the present invention is illustrated in FIG. 5B. The fourth cross-sectional view 72 illustrates the preferred blazed grating light valve 20 in the activated state with the incident light I at the oblique angle $\theta_i$ to the grating plane 62. In the fully activated state, the incident light I is diffracted into an oblique first order diffraction $D'_1$, which is normal to the grating plane 62.

A first advantage of the preferred blazed grating light valve 20 is that the preferred blazed grating light valve 20 provides a blazed diffraction in the activated state while quickly switching between the non-activated state and the activated state. This is because the elongated elements are translated rather than rotated.

A second advantage of the preferred blazed grating light valve 20 is that in the non-activated state none of the incident light I is diffracted into the first diffraction order $D_1$ for the normal incidence and none of the incident light I is diffracted into the oblique first order diffraction $D'_1$ for the oblique incidence. In a display application where the preferred blazed grating light valve 20 produces an array of pixels and where a bright pixel corresponds to either the first diffraction order $D_1$ or the oblique first order diffraction $D'_1$, this provides a dark pixel of an image. In a telecommunications application, where the preferred blazed grating light valve 20 operates as a switch and where an on-state of the switch corresponds to either the first diffraction order $D_1$ or the oblique first order diffraction $D'_1$, this provides an off-state for the switch.

A third advantage of the preferred blazed grating light valve 20 is that, in the activated state, the incident light I is diffracted into a single diffraction order which is either the first diffraction order $D_1$ for the normal incidence or the oblique first order diffraction $D'_1$ for the oblique incidence. In the display application where the preferred blazed grating light valve 20 produces the array of pixels and where the bright pixel corresponds to either the first diffraction order $D_1$ or the oblique first order diffraction $D'_1$, this simplifies display optics since only the single diffraction order is collected to produce the bright pixel. In the telecommunications application, where the preferred blazed grating light valve 20 operates as the switch and where the on-state of the switch corresponds to either the first diffraction order $D_1$ or the oblique first order diffraction $D'_1$, this provides efficient utilization of the incident light I since the incident light I is diffracted into the single diffraction order.

A fourth advantage of the preferred blazed grating light valve is that because, in the non-activated state, none of the incident light I is diffracted into either the first diffraction order $D_1$ for the normal incidence or the oblique first order diffraction $D'_1$ for the oblique incidence and because, in the activated state, the incident light I is diffracted into the single diffraction order, the preferred blazed grating light valve 20 provides a high contrast ratio between the non-activated state and the activated state. Typically, this contrast ratio is on an order of a thousand to one. In the display application where the preferred blazed grating light valve 20 produces the array of pixels and where the bright pixel corresponds to either the first diffraction order $D_1$ or the oblique first order diffraction $D'_1$, this produces a high contrast image. In the telecommunications application, where the preferred blazed grating light valve 20 operates as the switch and where the on-state of the switch corresponds to either the first diffraction order $D_1$ or the oblique first order diffraction $D'_1$, this produces a high discrimination between the on-state and the off-state.

A fifth advantage of the preferred blazed grating light valve 20 is that, because the activated state diffracts the incident light I into the single diffraction order, a depth of focus of either the first diffraction order $D_1$ for the normal incidence or the oblique first order diffraction $D'_1$ for the oblique incidence is relatively long compared to a diffractive light modulator which diffracts useful light into multiple diffraction orders. In the display application where the preferred blazed grating light valve 20 produces the array of pixels and where the bright pixel corresponds to either the first diffraction order $D_1$ or the oblique first order diffraction $D'_1$, this allows for simpler optics. In a printing application, which is a type of display application where the bright pixel is typically used to illuminate a cylindrical drum, the longer depth of focus provides a sharper printed image.

A first partially fabricated blazed grating light valve of the present invention is illustrated in FIGS. 6A, 6B, and 6C. Fabrication of the first partially fabricated grating light valve 80 begins with a silicon substrate 82. Next, a field oxide layer 84 is formed on the silicon substrate 82 by preferably heating the silicon substrate in an oxygen atmosphere. Preferably, the field oxide layer has a thickness of about 1.0

μm. Following this, a conducting layer 86 is deposited on the field oxide layer 84. Preferably, the conducting layer 86 has a thickness of about 0.35 μm and comprises doped poly-silicon deposited using an LPCVD (low pressure chemical vapor deposition) process. Subsequently, an etch stop 88 is formed on the conducting layer 86. Preferably, the etch stop 88 comprises a second field oxide layer formed by heating the poly-silicon in the oxygen environment. Preferably, the etch stop 88 has a thickness of about 200 Å. Next, a sacrificial layer 90 is deposited on the etch stop 88. Preferably, the sacrificial layer 90 comprises poly-silicon deposited using the LPCVD process. Preferably, the sacrificial layer 90 has a thickness about 1.0 μm. Alternatively, the sacrificial layer has a thickness greater than or about equal to a wavelength $\lambda$ of the incident light I.

A second partially fabricated blazed grating light valve of the present invention is illustrated in FIGS. 7A, 7B, and 7C. Fabrication of the second partially fabricated grating light valve 92 begins with the first partially fabricated blazed grating light valve 80 (FIGS. 6A, 6B, and 6C). Fabrication of the second partially fabricated grating light valve 92 comprises first and second etching steps using photolithography and a semiconductor etching technique, such as plasma etching. The first etching step etches step producing features 93 into the sacrificial layer 90. Preferably, the step producing features 93 have a height of an eighth wavelength $\lambda/8$ of the incident light I. For example, if the incident light is green light having a wavelength $\lambda$ of 5,280 Å, the height of the step producing features 93 is preferably 660 Å. The second etching step etches post holes 94 into the sacrificial layer 90 and also etches anchor holes (not shown) into the sacrificial layer 90. The anchor holes form the first and second anchors, 29 and 31 (FIG. 2B). The second etching step also etches sacrificial layer edges (not shown) where first and second ends, 38 and 40, of each of the elongated elements 24 couple to the substrate 22 (FIG. 2B).

A third partially fabricated blazed grating light valve of the present invention is illustrated in FIGS. 8A, 8B, and 8C. Fabrication of the third partially fabricated blazed grating light valve 100 begins with the second partially fabricated blazed grating light valve 92 (FIGS. 7A, 7B, and 7C). Fabrication of the third partially fabricated blazed grating light valve 100 comprises depositing a resilient material 102 on the second partially fabricated grating light valve 92 and then depositing a metal 104 on the resilient material 102. Preferably, the resilient material 102 comprises silicon nitride. Preferably, the resilient material 102 coats surfaces of the post holes 94 and the anchor holes of the second partially fabricated grating light valve 92. Alternatively, the resilient material 102 more substantially fills the post holes 94 and the anchor holes. Further alternatively, the resilient material fills the post holes 94 and the anchor holes. (Note that FIGS. 8A and 8B depict the resilient material 102 filling the post holes 94 as a simplification for more easily understood illustrations.) Preferably, the resilient material has a tensile stress of about 1 GPa. Preferably, the resilient material 102 has a thickness of about 920 Å and is deposited using an LPCVD process. Preferably, the metal 104 comprises alumuinum having a thickness of about 500 Å. Preferably, the metal 104 is deposited using a physical vapor deposition technique.

A fourth partially fabricated blazed grating light valve of the present invention is illustrated in FIGS. 9A, 9B, and 9C. Fabrication of the fourth partially fabricated blazed grating light valve 110 begins with the third partially fabricated blazed grating light valve 100 and comprises etching the metal 104 and the resilient material 102 to form fabricated elongated elements 24A supported by the sacrificial layer 90.

A fabricated blazed grating light valve of the present invention is illustrated in FIGS. 10A, 10B, and 10C. Fabrication of the fabricated blazed grating light valve 116 begins with fourth partially fabricated blazed grating light valve 110 and comprises etching the sacrificial layer 90 to completion using a xenon difluoride etch. This produces the fabricated elongated elements 24A coupled to a fabricated substrate 22A by fabricated first and second posts, 26A and 28A, with each of the fabricated elongated elements 24A comprising first and second fabricated surfaces, 32A and 34A.

It will be readily apparent to one skilled in the art that suitable electrical connections for the fabricated blazed grating light valve 116 comprise bond pads, which are well known both in structure and fabrication. Further, it will be readily apparent to one skilled in the art that the fabricated blazed grating light valve 116 is a particular embodiment of the present invention and that accordingly the preferred blazed grating light valve 20 more generally describes the present invention.

Figure 11:
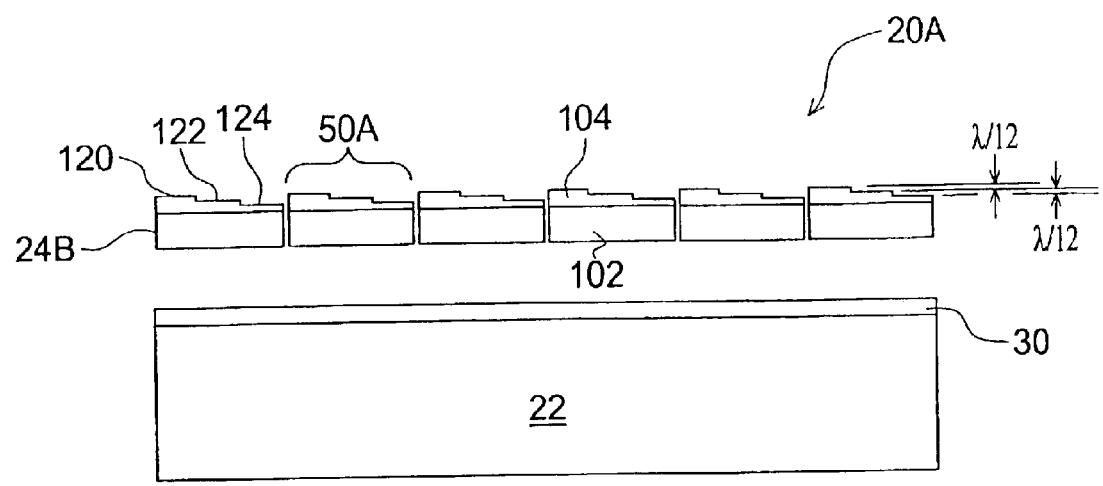
FIG. 11 illustrates a first alternative grating light valve of the present invention.

A cross-sectional view of a first alternative blazed grating light valve of the present invention is illustrated in FIG. 11. The first alternative blazed grating light valve 20A replaces the elongated elements 24 of the preferred blazed grating light valve 20 with first alternative elongated elements 24B. The first alternative elongated elements 24B comprise a three-step profile 50A having first, second, and third alternative surfaces, 120, 122, and 124. A height difference between the first and second alternative surfaces, 120 and 122, and between the second and third alternative surfaces, 122 and 124, is preferably a twelfth wavelength $\lambda/12$ of the incident light I. Thus, the three step profile 50A forms an alternative blazed profile of the present invention.

It will be readily apparent to one skilled in the art that additional steps may be added to the first alternative elongated elements 24B with a corresponding adjustment in height between adjacent surfaces.

Figure 12:
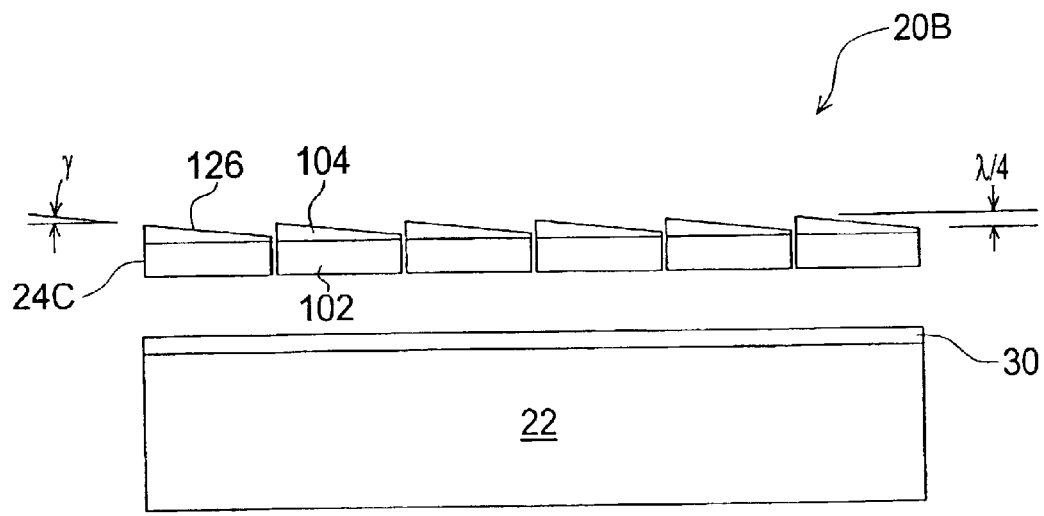
FIG. 12 illustrates a second alternative grating light valve of the present invention.

A second alternative blazed grating light valve of the present invention is illustrated in FIG. 12. The second alternative blazed grating light valve 20B replaces the elongated elements 24 of the preferred blazed grating light valve 20 with second alternative elongated elements 24C. The second alternative elongated elements 24C replace the stepped profile 50 of the elongated elements 24 with a flat surface 126 at the blaze angle $\gamma$.

Figure 13:
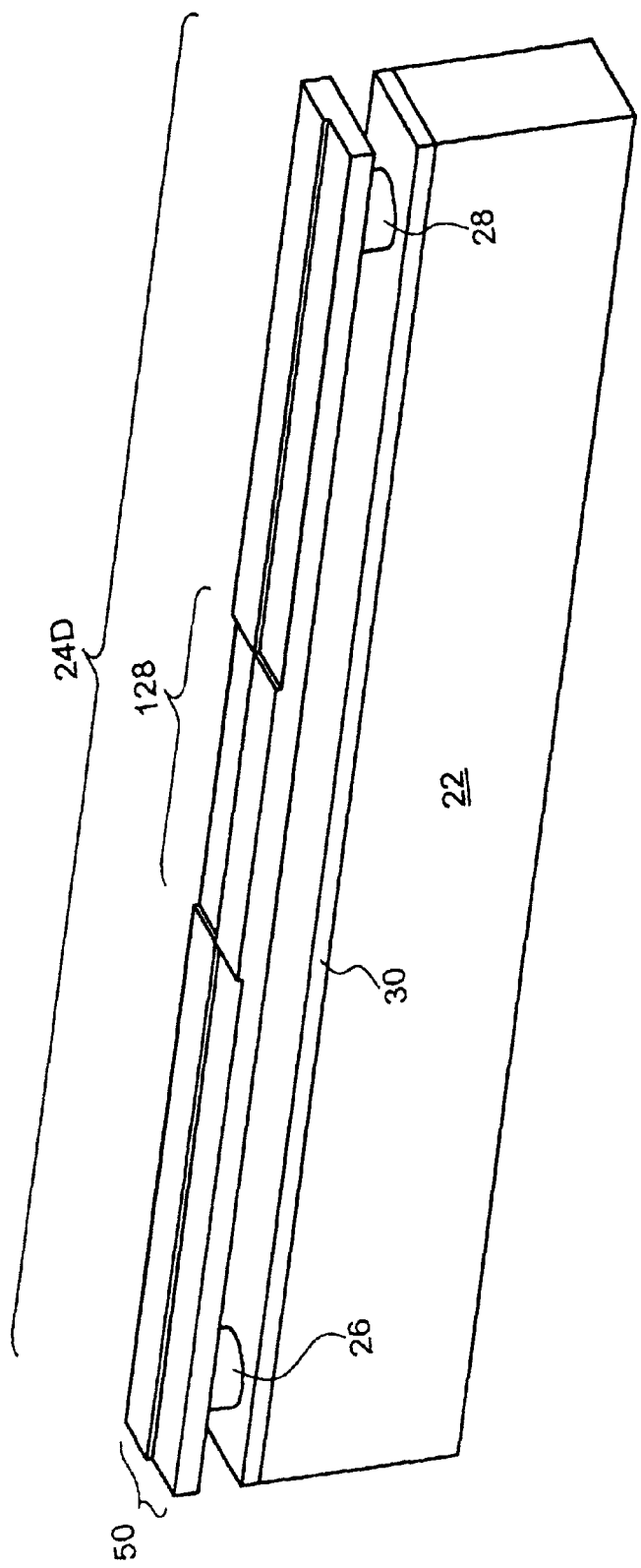
FIG. 13 illustrates an alternative elongated element and the underlying substrate of the present invention.

A third alternative blazed grating light valve of the present invention replaces the elongated elements 24 of the preferred blazed grating light valve 20 with third alternative elongated elements. One of the third alternative elongated elements and the substrate 22 are illustrated in FIG. 13. The third alternative elongated element 24D reverses the stepped profile 50 of a central region 128 outside of the central region 128. In the activated state, the third alternative blazed grating light valve diffracts the incident light I within the central region 128 into the first diffraction order $D_1$ at the first order angle $\theta_1$ while diffracting the incident light I just outside the central region 128 at minus the first order angle $\theta_1$. Thus, much of the incident light I diffracted between the first post 26 and the central region and between the central region 128 and the second post 28 is directed away from the first order angle $\theta_1$, reducing unwanted stray light in downstream optics.

Figure 14A:
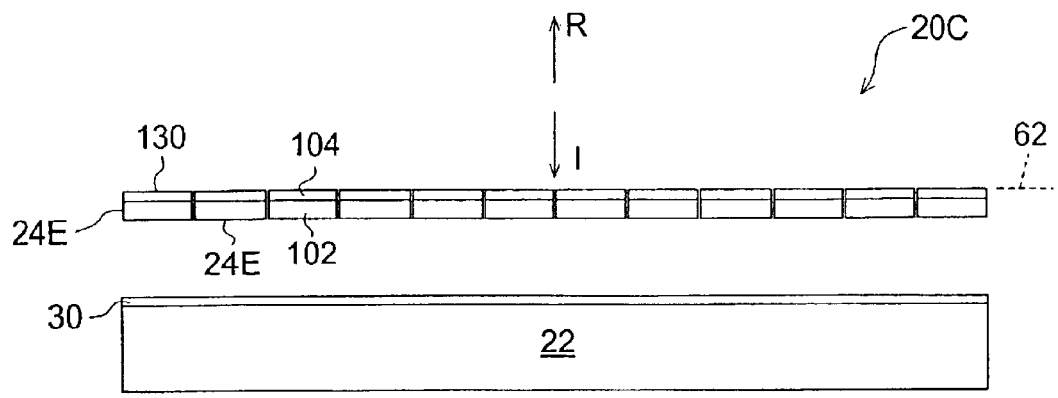
FIG. 14A illustrates a third alternative grating light valve in a reflection state.

A fourth alternative blazed grating light valve of the present invention is illustrated in FIG. 14A. The fourth alternative blazed grating light valve 20C comprises fourth alternative elongated elements 24E. The fourth alternative elongated elements 24E each comprise a flat reflective surface 130, which in the non-activated state shown in FIG. 14A, places the flat reflective surfaces 130 in the grating plane 62. When the fourth alternative blazed grating light valve 20C is in the non-activated state and is illuminated by the incident light I, the fourth alternative grating light valve 20C produces the reflected light R.

Figure 14B:
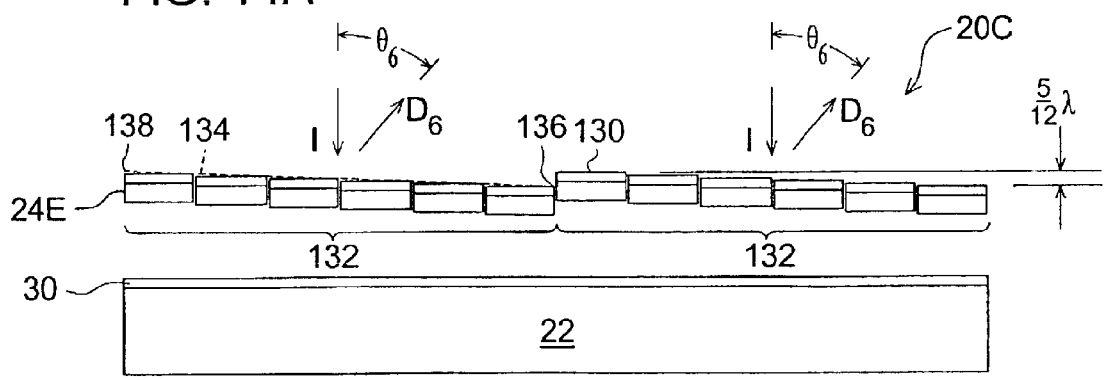
FIG. 14B illustrates the third alternative grating light valve in a first diffractive state, which places diffracted light into a diffraction angle.

The fourth alternative blazed grating light valve 20C of the present invention is further illustrated in FIG. 14B showing the fourth alternative blazed grating light valve 20C in a first activated state. The fourth alternative blazed grating light valve 20C provides dynamic control of the fourth alternative elongated elements 24E so that variable groupings of the fourth alternative elongated elements 24E produce a variable angle blazed diffraction. In the first activated state, six element groups 132 of the fourth alternative elongated elements 24E produce a six element blazed diffraction $D_6$ having a diffraction angle $\theta_6$. Since the six element groups 132 approximate an effective blaze 134, a height difference from a first point 136 to a second point 138 on the effective blaze 134 is a half wavelength $\lambda/2$ of the incident light I. Thus, an actual height difference between lowest and highest elongated elements 24E is preferably five twelfths wavelength $5\lambda/12$ of the incident light I.

In general, an nth element blazed diffraction produces first diffracted light having an nth diffraction angle $\theta_n$. The nth diffraction angle $\theta_n$ is given by the expression:

$$\theta_n = \arcsin(\lambda/(n(w+s)))$$

where $\lambda$=wavelength of the incident light I, n=number of elements in an n element group, w=width of each of the fourth alternative elongated elements 24E, and s=space between adjacent pairs of the fourth alternative elongated elements 24E.

To produce the nth diffracted light, an nth element group is preferably arranged with outer ones of the fourth alternative elongated elements 24E having an nth element group height difference ($d_n$) given by the expression:

$$d_n = (n-1)(\lambda/(2n))$$

In a particular embodiment of the fourth alternative blazed grating light valve 20C, the fourth alternative elongated elements 24E have the width w of 2.0 μm and the spaces s of negligible length. Table 1 provides the diffraction angle $\theta_n$ and the group height difference $d_n$ for a 5,280 Å green light and the n element grouping of four, five, six, and seven elements.

TABLE 1

| n | $\theta_n$ | $d_n$ |
|---|---|---|
| 4 | 3.78° | 1,980 Å |
| 5 | 3.03 | 2,112 |
| 6 | 2.52 | 2,200 |
| 7 | 2.16 | 2,263 |

Figure 14C:
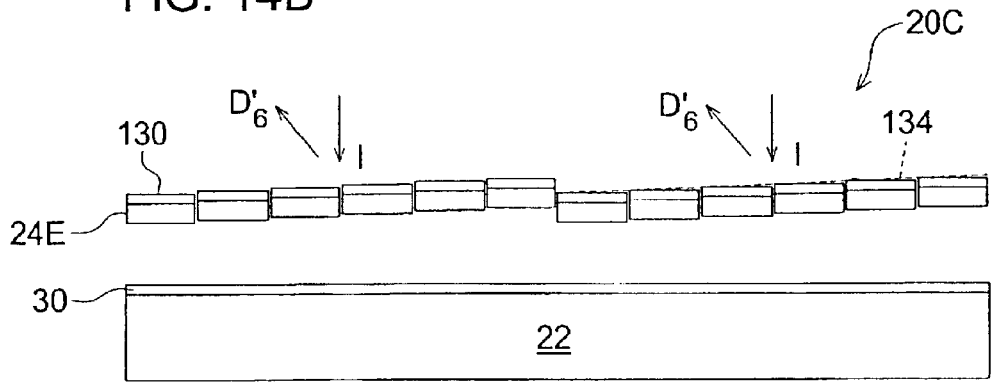
FIG. 14C illustrates the third alternative grating light valve in a second diffractive state, which places diffracted light into minus the diffraction angle.

The fourth alternative blazed grating light valve 20C of the present invention is further illustrated in FIG. 14C showing the fourth alternative blazed grating light valve 20C in a second activated state. In the second activated state, the effective blaze 134 has been reversed by reversing heights of the fourth alternative elongated elements 24E of the six element groups 132 to produce a reverse six element blazed diffraction $D'_6$. Thus, the dynamic control of the fourth alternative elongated elements 24E provides an ability to reverse the effective blaze 134 and doubles a number of discrete diffraction angles which the fourth alternative blazed grating light valve 20C provides.

In a telecommunications application, the fourth alternative blazed grating light valve 20C functions as a variable switch. For example, using the four, five, six, and seven element groups in reversible configurations allows for eight diffractive angles, which provides an eight channel switch. Further, the fourth alternative grating light valve 20C can be cascaded with eight additional fourth alternative blazed grating light valves 20C to form a sixty-four channel switch.

It will be readily apparent to one skilled in the art that other various modifications may be made to the preferred embodiment without departing from the spirit and scope of the invention as defined by the appended claims.

We claim:

1. A method of fabricating a light modulator comprising the steps of:
   a. depositing a sacrificial layer on a substrate;
   b. depositing a resilient material on the sacrificial layer;
   c. depositing a reflective material on the resilient material;
   d. etching the resilient material and the reflective material to form elongated elements supported by the sacrificial layer, each elongated element comprising at least two planar surfaces, the two planar surfaces of each of the elongated elements comprising a blaze profile; and
   e. etching the sacrificial layer to completion leaving the elongated elements coupled to the substrate.

2. The method of claim 1 further comprising the steps of:
   a. forming an oxide layer on the substrate between substrate and the sacrificial layer prior to depositing the sacrificial layer; and
   b. depositing a conductive layer on the oxide layer between the oxide layer and the sacrificial layer prior to depositing the sacrificial layer.

3. The method of claim 2 wherein the substrate comprises silicon and further wherein the oxide layer comprises a field oxide layer of silicon dioxide.

4. The method of claim 2 further comprising the step of depositing an etch stop on the conductive layer.

5. The method of claim 4 wherein the etch stop comprises silicon dioxide.

6. The method of claim 4 wherein the etch stop comprises silicon nitride.

7. The method of claim 2 wherein the conductive layer comprises doped poly-silicon.

8. A method of fabricating a light modulator comprising the steps of:
   a. depositing a sacrificial layer on a substrate;
   b. depositing a resilient material on the sacrificial layer;
   c. etching first post holes and second post holes through the sacrificial layer;
   d. etching edges of the sacrificial material to form a delineated sacrificial layer, thereby forming exposed underlying layers;
   e. depositing a reflective material on the resilient material;
   f. etching the resilient material to form elongated elements supported by the sacrificial layer; and
   g. etching the sacrificial later to completion leaving the elongated elements coupled to the substrate.

9. The method of claim 8 wherein sacrificial layer comprises poly-silicon.

10. The method of claim 9 wherein the step of etching the sacrificial layer to completion comprises a xenon difluoride etch.

11. The method of claim 8 wherein the step of depositing the resilient material further comprises depositing the resilient material within the first and second post holes and depositing the resilient material on the exposed underlying layers.

12. The method of claim 11 wherein the resilient material comprises silicon nitride.

13. The method of claim 11 wherein each of the elongated elements comprise a first end and a second end, the first and second ends of each of the elongated elements coupled to the substrate by the underlying layers outside of the delineated sacrificial layer.

14. The method of claim 1 further comprising the step of etching strips into the sacrificial layer such that the strips etched into the sacrificial layer produce the two planar surfaces of each of the elongated elements.

15. The method of claim 1 wherein the reflective material comprises aluminum.

16. The method of claim 1 wherein the steps of depositing the reflective material and etching the resilient material and the reflective material comprise the steps of:
  a. depositing a first layer of the reflective material;
  b. etching the first layer of the reflective material to form strips of the reflective material where the strips correspond to one of the planar surfaces of the blaze profile of the elongated elements;
  c. depositing a second layer of the reflective material; and
  d. etching the resilient material and the reflective material to form the elongated elements comprising the two planar surfaces.

17. The method of claim 1 wherein each of the elongated elements comprise a first end and a second end, the first and second ends of each of the elongated elements coupled to the substrate by the underlying layers outside of the delineated sacrificial layer.

18. A method of depositing reflective material and etching resilient material and reflective material on a light modulator comprising the steps of:
  a. depositing a first layer of a reflective material;
  b. etching the first layer of the reflective material to form strips of the reflective material;
  c. depositing a second layer of the reflective material; and
  d. etching a resilient material and the reflective material to form the elongated elements.

19. The method of claim 18 wherein the elongated elements comprise two planar surfaces wherein the strips of the reflective material correspond to one of the planar surfaces of the blaze profile of the elongated elements.

* * * * *